(12) United States Patent
Ford et al.

(10) Patent No.: US 10,779,675 B2
(45) Date of Patent: Sep. 22, 2020

(54) BREWER SYSTEM, METHOD AND APPARATUS

(71) Applicant: BUNN-O-MATIC CORPORATION, Springfield, IL (US)

(72) Inventors: David F. Ford, Springfield, IL (US); Chris Goodrich, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 288 days.

(21) Appl. No.: 15/781,989

(22) PCT Filed: Dec. 7, 2016

(86) PCT No.: PCT/US2016/065387
§ 371 (c)(1),
(2) Date: Jun. 6, 2018

(87) PCT Pub. No.: WO2017/100326
PCT Pub. Date: Jun. 15, 2017

(65) Prior Publication Data
US 2018/0360256 A1    Dec. 20, 2018

Related U.S. Application Data

(60) Provisional application No. 62/264,288, filed on Dec. 7, 2015.

(51) Int. Cl.
*A47J 31/36*        (2006.01)
*A47J 31/32*        (2006.01)
*A47J 31/06*        (2006.01)

(52) U.S. Cl.
CPC ........... *A47J 31/3652* (2013.01); *A47J 31/06* (2013.01); *A47J 31/0657* (2013.01); *A47J 31/32* (2013.01)

(58) Field of Classification Search
CPC .... A47J 31/3652; A47J 31/06; A47J 31/0657; A47J 31/32
See application file for complete search history.

(56) References Cited

U.S. PATENT DOCUMENTS

| | | | |
|---|---|---|---|
| 3,046,869 A | * | 7/1962 | Reynolds .............. A47J 31/408 99/289 R |
| 3,356,011 A | | 12/1967 | Parraga |
| 4,506,596 A | | 3/1985 | Shigenobu et al. |

(Continued)

FOREIGN PATENT DOCUMENTS

WO    WO 1988/002612    4/1988

OTHER PUBLICATIONS

Search Report and Written Opinion issued in App. No. PCT/US2016/065387 (dated 2017).

*Primary Examiner* — Ryan J. Walters
(74) *Attorney, Agent, or Firm* — Barnes & Thornburg LLP

(57) ABSTRACT

A brewer system includes a reservoir, a steeping chamber movable relative to the reservoir and positioned over a mouth of the reservoir, and a filter tape positioned between the chamber and the reservoir. Brewing substance and water are added to the chamber and can be controllably agitated using a controllable gas pump coupled to the reservoir to form a brewed beverage. The brewed beverage can be drawn through the filter tape and into the reservoir through the mouth under the influence of a controllable vacuum pump coupled to and controllably communicating with the reservoir.

9 Claims, 3 Drawing Sheets

(56) References Cited

U.S. PATENT DOCUMENTS

| | | | |
|---|---|---|---|
| 4,757,752 | A | 7/1988 | Robins et al. |
| 4,967,647 | A | 11/1990 | King |
| 5,197,373 | A | 3/1993 | De Jong |
| 5,297,472 | A | 3/1994 | Suzuki et al. |
| 5,393,540 | A | 2/1995 | Bunn et al. |
| 5,878,653 | A | 3/1999 | Verhoef |
| 6,041,693 | A | 3/2000 | Fukushima |
| 6,279,461 | B1 | 8/2001 | Fukushima et al. |
| 7,448,314 | B2 | 11/2008 | Ioannone et al. |
| 7,581,489 | B2 | 9/2009 | Van Hattem et al. |
| 7,726,233 | B2 | 6/2010 | Kodden et al. |
| 7,858,135 | B2 | 12/2010 | Radosav |
| 8,286,547 | B1 | 10/2012 | Lassota |
| 8,850,958 | B2 | 10/2014 | McCormick et al. |
| 8,950,318 | B2 | 2/2015 | Ford |
| 2011/0039009 | A1 | 2/2011 | Jones et al. |
| 2012/0100275 | A1 | 4/2012 | Bishop et al. |
| 2013/0156899 | A1 | 6/2013 | Quinn et al. |
| 2013/0344205 | A1 | 12/2013 | Oh |
| 2014/0170280 | A1 | 6/2014 | St. Germain et al. |
| 2017/0055759 | A1 | 3/2017 | Radosav |
| 2019/0365139 | A1* | 12/2019 | Mazzini .................. A23F 5/26 |

* cited by examiner

BREWER SYSTEM, METHOD AND APPARATUS

PRIORITY CLAIM

This application is a U.S. nationalization under 35 U.S.C. § 371 of International Application No. PCT/US2016/065387, filed Dec. 7, 2016, which claims priority under 35 U.S.C. § 119(e) to U.S. Provisional Application Ser. No. 62/264,288, filed Dec. 7, 2015. The disclosures set forth in the referenced applications are incorporated herein by reference in their entireties.

BACKGROUND

A variety of brewing systems have been developed which provide for individual cups of coffee to be brewed on demand. Current brewing systems typically only allow a single size serving to be produced in the brewing process. One way to try to resolve this would be to brew multiple cups of coffee to achieve a multivolume dispense into the consumer's cup. However, interruptions in the dispensing of coffee could result in the customer removing the cup prematurely, being frustrated by the multi-dispense cycle, and possible cooling in between, as well as other issues.

Prior systems use a method of collecting spent filter tape that detects the size of the roll as analogously measured by the diameter of the spent filter tape roll. This is undesirable since filter tape is wasted because a larger volume of filter tape is being taken up than is actually used. As the diameter of the spool grows because of the collection of tape around the spool, a single revolution takes up a longer length of filter tape which then results in a significant amount of wasted filter tape.

For the foregoing reasons, it is desirable to try to improve the available system.

This background information is provided to provide some information believed by the applicant to be of possible relevance to the present disclosure. No admission is intended, nor should such admission be inferred or construed, that any of the preceding information constitutes prior art against the present disclosure. Other aims, objects, advantages and features of the disclosure will become more apparent upon reading of the following non-restrictive description of specific embodiments thereof, given by way of example only with reference to the accompanying drawings.

SUMMARY

According to the present disclosure, a brewer system includes a reservoir, a steeping chamber movable relative to the reservoir and positioned over a mouth of the reservoir, and a filter tape positioned between the chamber and the reservoir. Brewing substance and water are added to the chamber to form a brewed beverage that passes through the filter tape and into the reservoir through the mouth.

In illustrative embodiments, a pressure control system is coupled to the reservoir to adjust a pressure within the reservoir. The pressure control system includes a gas pump and a vacuum pump. The gas pump pressurizes the reservoir to drive gas through the mouth into the chamber to agitate the brewing substance and water. The vacuum pump removes gas from the reservoir to form at least a partial vacuum and pull brewed beverage into the reservoir through the mouth.

In illustrative embodiments, the brewer system is automated with a controller. The controller operates a brewing substance delivery system to dispense brewing substance into the chamber. A vacuum sensor is coupled to the reservoir and the controller and senses when a vacuum in the reservoir drops off to a predetermined or below a predetermined level to signal an end of the brew cycle. A filter sensor system provides a signal to the controller when a predetermined length of filter tape is moved after the brew cycle is completed.

In illustrative embodiments, multiple brew cycles are completed before dispensing the accumulated brewed beverage from the reservoir.

BRIEF DESCRIPTION OF THE DRAWINGS

The present disclosure will be described hereafter with reference to the attached drawings which are given as a non-limiting example only, in which.

Figure 1:
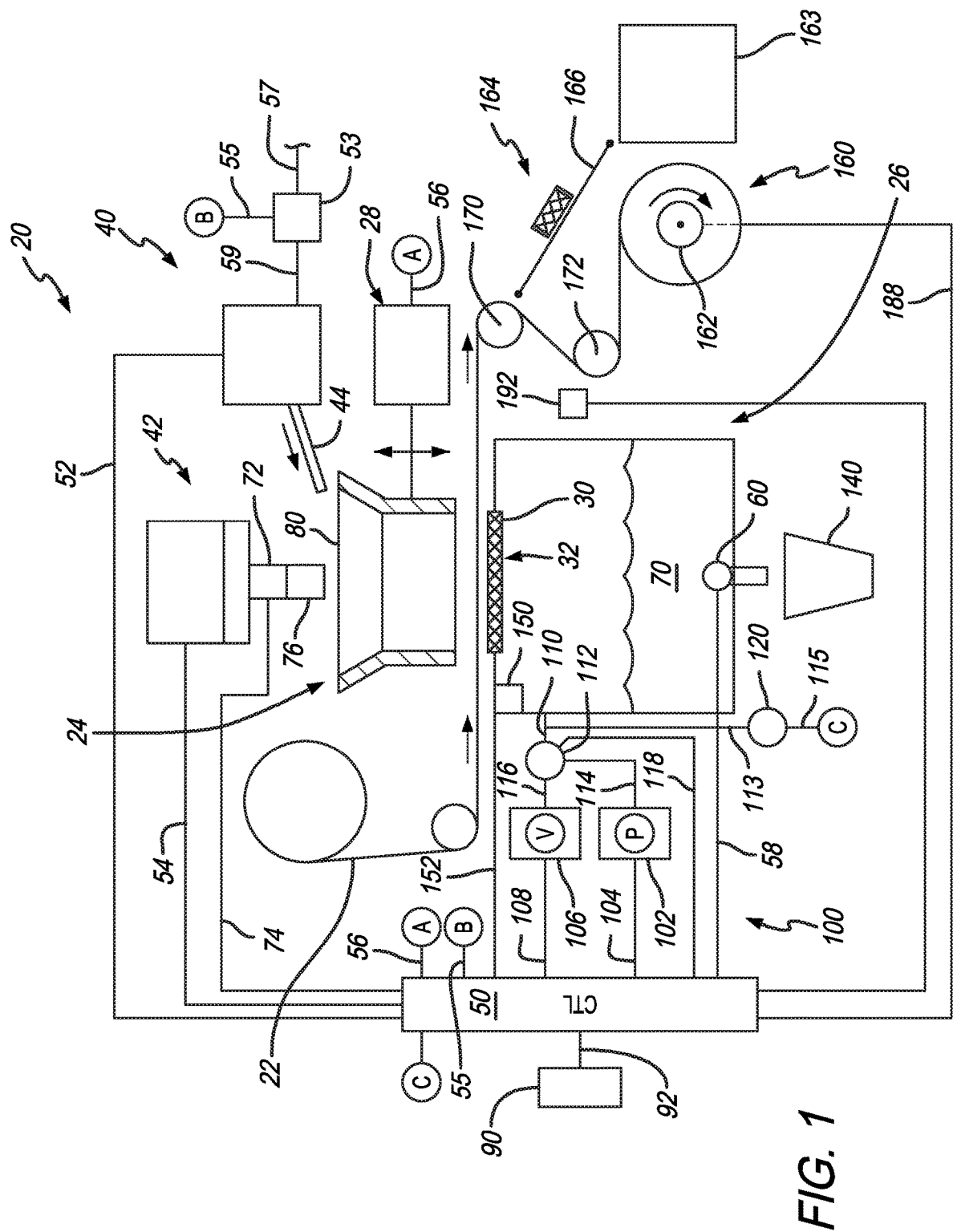
FIG. 1 is a block diagram illustrating a brewer system in accordance with the present disclosure showing that the brewer system includes a brew reservoir, a steeping chamber positioned above the brew reservoir for movement relative thereto, a filter tape positioned between the steeping chamber and the brew reservoir, a brewing substance delivery system for delivering brewing substance to the chamber, a water delivery system for delivering water to the chamber, a controller coupled to the various components in the system, a tape take-up system, and a pressure control system including a vacuum pump, gas pump, a multipath valve and a vacuum sensor which are all coupled to the controller.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. In addition, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

Terms including beverage, brewed, brewing, brewing substance, brewed liquid, and brewed beverage as may be used herein are intended to be broadly defined as including, but not limited to, the brewing of coffee, tea and any other beverages. This broad interpretation is also intended to include, but is not limited to any process of dispensing, infusing, steeping, reconstituting, diluting, dissolving, saturating or passing a liquid through or otherwise mixing or combining a brewing substance with a liquid such as water without limitation to the temperature of such liquid unless specified. This broad interpretation is also intended to include, but is not limited to, brewing substances such as ground coffee, tea, liquid beverage concentrate, powdered beverage concentrate, flaked, granular, freeze dried or other forms of materials including liquid, gel, crystal or other forms of beverage or food materials to obtain a desired beverage or other food product. Beverage brewing substances will be described in the present application and generally will be referred to as "coffee". However, it should be understood that the term brewing substance should be broadly interpreted regardless of reference to brewing substance or coffee.

The foregoing terms as well as other terms should be broadly interpreted throughout this application to include all known as well as all hereafter discovered versions, equivalents, variations and other forms of the abovementioned terms as well as other terms. The present disclosure is intended to be broadly interpreted and not limited.

As shown in FIG. 1, a brewer system 20 is illustrated in a generally diagrammatic form. The brewer system 20 traps a filter tape 22, such as a porous fabric or paper tape, between a steeping chamber 24 and a collection reservoir 26 to brew a beverage, such as coffee. A chamber-displacement mechanism 28 is designed and configured to controllably move the chamber 24 relative to the tape 22 and the reservoir 26. As illustrated, one embodiment is for the chamber-displacement mechanism 28 to lift the chamber 24 upwardly and downwardly relative to the tape 22 to selectively retain the chamber 24 over the tape 22. The reservoir 26 is formed with a mouth 30 having a generally permanent retaining filter element 32 retained in the area of the mouth 30. This permanent filter element 32 helps to provide structural support underneath the filter tape 22 when it is positioned between the chamber 24 and over the mouth of the reservoir 26 for brewing.

A controllable water delivery system 40 and a brewing substance delivery system 42 are controllably coupled to a controller 50 over lines 52 and 54, respectively. It should be noted that the chamber-displacement mechanism 28 is coupled to the controller 50 over line 56. During a brewing cycle, the chamber 24 is positioned by the chamber-displacement mechanism 28 over the filter tape 22 on top of the reservoir 26 to form a seal around the mouth 30. Brewing substance, such as ground coffee, is dispensed from the brewing substance delivery system 42 into the chamber 24. Brewing substance can be retained in the delivery system 42 and be controllably dispensed using the controller 50. In some embodiments, brewing substance, such as fresh whole coffee beans, can be retained in the delivery system 42 and controllably ground on demand using a grinding mechanism 72 coupled to the controller 50 over line 74. A dispense chute or nozzle 76 directs the ground material into an open top portion 80 of the chamber 24. Water is dispensed from the water delivery system 40 through a dispense port 44 into the chamber 24 for mixing with the brewing substance to form a slurry which is retained in the steeping chamber 24. The water can be at any temperature depending on the recipe and the substances used for the beverage being made, but is heated for brewing coffee in the present example. In some embodiments, water delivery system 40 is in the form of a holding tank which is controllably filled from an inlet line 57 using a controllable valve 53. Valve 53 is coupled to controller 50 by line 55 and to water delivery system 40 by line 59.

Water is introduced from the water delivery system 40 by the controller 50 to controllably dispense a predetermined volume of water to be mixed with a predetermined volume of brewing substance. The dispense port 44 can be positioned to direct water into the chamber 24 such that swirling and mixing of the water with the brewing substance in the chamber 24 is induced to form a slurry. In this configuration, the brewing substance can be allowed to steep for a while to extract desirable characteristics from the brewing substance. A predetermined steeping or "dwell" time can be programmed at the controller 50 either in the factory or by a user at a control interface 90 coupled to the controller over line 92.

At a predetermined time during the brew cycle, either at the beginning or after a predetermined steep time, a pressure control system 100 is operated to provide positive pressure to the reservoir 26 to drive a gas, such as ambient atmosphere or "air," upwardly through the permanent filter element 32 and through the tape 22 to cause agitation of the slurry. The pressure control system 100 can also be controllably operated to provide negative pressure, or vacuum, to draw brewed beverage 70, such as liquid coffee, from the slurry in the chamber 24 through the filter tape 22 and through the permanent filter element 32. The pressure control system 100 includes a controllable gas pump 102 coupled to the controller 50 over line 104 and a vacuum pump 106 coupled to the controller 50 over line 108. The gas pump 102 and vacuum pump 106 communicate with a reservoir line 110. Positioned in the reservoir line 110 is a multi-way valve 112. The multi-way valve 112 allows the gas pump 102 to communicate with the valve 112 over line 114 and the vacuum pump 106 to communicate with the valve 112 over line 116. The multi-way valve 112 is connected to the controller 50 over line 118.

During the brewing cycle one or more positive pressure agitation cycles can be used to agitate the slurry in the chamber 24. At the end of the cycle, the vacuum pump 106 is operated to pull brewed beverage 70 from the slurry through the filter tape 22 and permanent filter element 32 into the reservoir 26. If a sufficient volume of brewed beverage 70 has been brewed it can be dispensed directly through a dispense valve 60 into a cup 140. However, if multiple dispenses are required, the system 20 can cycle to remove the spent brewing substance 164 and operate a new brew cycle to provide an additional volume of brewed beverage 70 for dispensing to the consumer. In this type of brew cycling, multiple batches of brewed beverage 70 are produced and retained in the reservoir 26 to create a delay or buffer so that the combined volume of brewed beverage 70 is dispensed as a single dispense. This controlled dispensing eliminates the problems associated with multiple dispense confusion by the user. In other words, when the required total volume of brewed beverage 70 has been produced, using more than one brewing cycle, and collected and retained in the reservoir 26, the total combined volume can be dispensed as a single serving dispense step at the end of the multiple brewing cycles. The dispense valve 60 of the reservoir 26 is coupled to the controller 50 over line 58. The dispense valve 60 can also be in a mechanical form, although it is preferable to provide a controllable dispense valve for multiple brew dispensing.

The system 20 optimizes the time of the brew cycle by including a vacuum sensor 120. The vacuum sensor 120 is coupled to and communicates with the line 110 to detect the vacuum in the line 110. While most of the other steps in the brew cycle can be defined by discreet time periods, the ability to draw all of the brewed beverage 70 out of the chamber 24 may not be optimized if only operated by a time cycle. In other words, depending on the temperature of the water, the type of brewing substance (coffee, tea, etc., and in the case of coffee, regular or decaf), the size of the brewing substance particles, and other conditions and variables, the time required to sufficiently drain the spent brewing substance 164 at the end of a brew cycle may be longer or shorter than a predetermined discreet preprogrammed period of time. If the time is too short, the spent brewing substance 164 will not be sufficiently drained and a liquid portion of slurry can flow off the filter tape 22 and create a mess in the brewer system 20. If the "drying" portion of the brew cycle runs too long, the spent brewing substance 164 will be dry but the time between brewing cycles will have been increased which wastes time and lowers efficiency. It is important to minimize the time for this step between brewing cycles especially if multiple batches are being brewed for a single user. This is also important when multiple users are addressing the brewer so that the amount of time between complete brew sessions can also be reduced. The "drying" portion of the brew cycle also dries the filter tape 22 to allow the filter tape to release from the filter element 32 and minimize sticking. Dry filter tape 22 and filter element 32 also maximizes venting of the reservoir 26 to allow adequate flow of the brewed beverage during dispensing.

In the illustrative embodiment, the vacuum sensor 120, coupled to the controller 50 by line 115, detects the drop of the vacuum to a predetermined or below a predetermined level of vacuum to provide a signal to the controller 50 to cease operation of the vacuum pump 106. The predetermined level of vacuum is set to correspond to that vacuum that indicates a sufficient amount of liquid has been drained from the beverage brewing substance/slurry. The chamber is open to the ambient atmosphere and as such this level of vacuum could be the point at which ambient atmosphere starts to be drawing through the remaining beverage brewing substance after most of the liquid component of the prior slurry has been removed. This will not result in dried substance, rather it is anticipated that the remaining substance will be moist. However, this sensing of the vacuum will help reduce unnecessary dwell time operating the vacuum pump and prevent under drained substance, as well.

The controller can be programmed with a maximum vacuum time which generally will be caused by an error in the system. As an example of one error, that could cause the vacuum pump to operate for a longer time, the filter could somehow become clogged or otherwise blocked. This could result in the liquid beverage not being drained from the slurry in the chamber. The maximum vacuum run time will be detected by the controller and alert the user to the error. The controller can then lockout further operation of the brewer until the error is diagnosed and cleared.

The sensor 120 can be in the form of a transducer coupled to the line 110 to directly detect the vacuum and provide a signal to the controller 50. The vacuum sensor 120 ensures a sufficient amount of brewed beverage 70 has been drained from the spent brewing substance 164 to prevent slurry spill or seepage off the tape 22. This also optimizes brew time by indicating when the formation of brewed beverage 70 is complete. In some embodiments, a power level of the vacuum pump 106 is sensed to detect a drop in power required to operate the pump indicating that the vacuum pull is sufficiently complete and the pump is drawing a vacuum through sufficiently drained brewing substance.

The reservoir 26 in the present embodiment is sized to accommodate multiple batch volumes of brewed beverage. The system 20 can offer multiple size choices for the dispensed volume of brewed beverage 70, and the volume that the reservoir 26 can receive and retain for each complete brew session is sized accordingly so that a single dispense of brewed beverage 70 is made at the end of the required number of brewing sessions. The size of the reservoir 26 can be determined based on the largest maximum volume to be produced plus, perhaps, some additional tolerance space or volume. A level sensor 150 coupled to the controller 50 over line 152 can be used to sense an overflow condition. While the system can be configured to prevent overflow by other controls associated with the components provided, a level sensor 150 can be included in the system.

Figure 3:
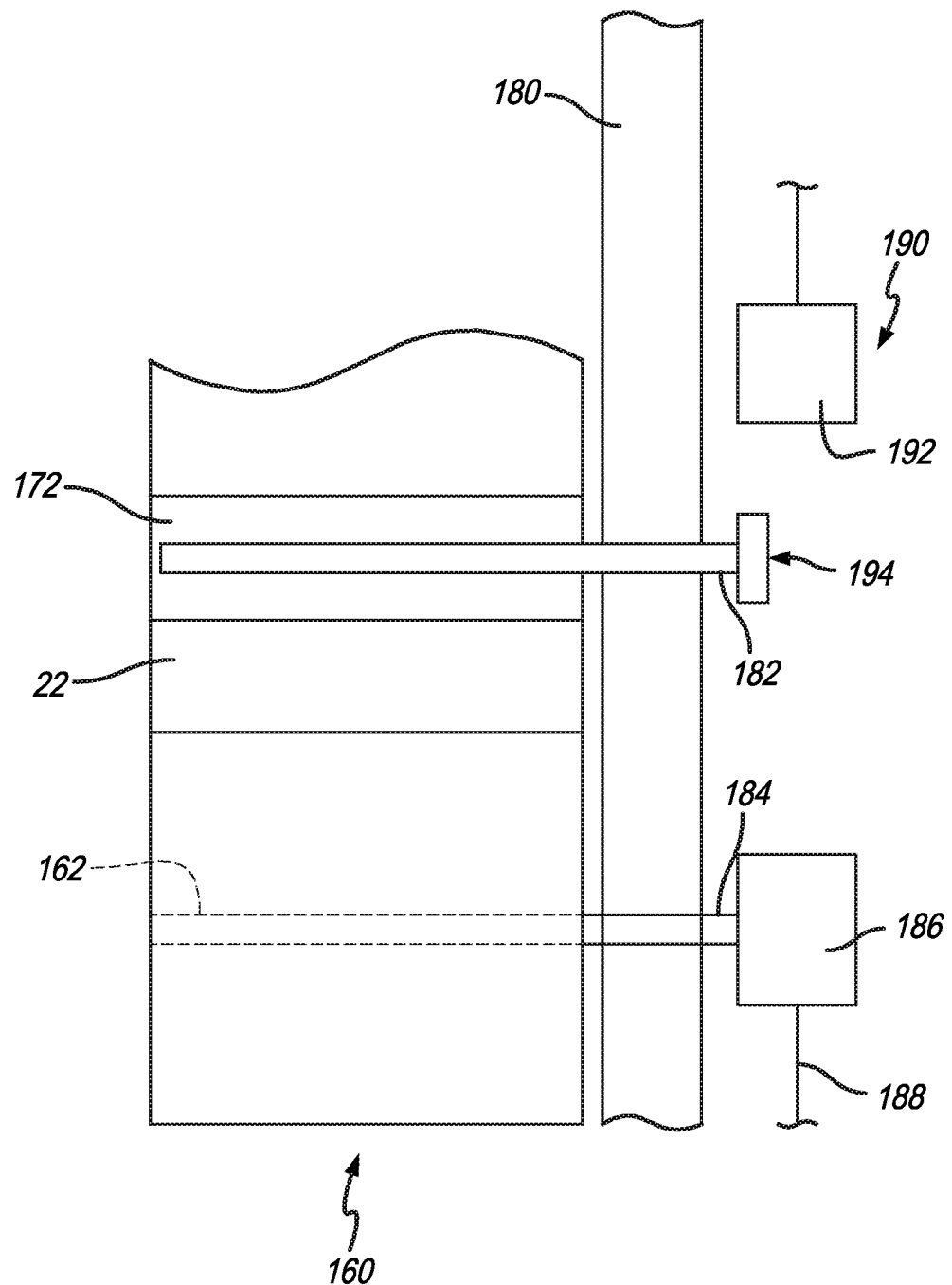
FIG. 3 is an enlarged view of a tape take-up system that is used to optimize the control of the take-up of spent filter material and for detecting a spool "full" condition requiring changing of the take-up spool.

Used tape 22 is collected by a filter tape take-up system 160. The tape take-up system 160 is shown in FIG. 1 and FIG. 3. As shown in FIG. 1, a primary take-up spool 162 is provided. This is the spool 162 to which the leading end of the tape 22 is attached to drive the take-up of the spent filter tape 22. As shown, the spent filter tape take-up system 160 also helps to transport a spent cake of drained brewing substance 164 from the tape 22 to a transfer slide 166 so it can be deposited into a waste bin 163 for accumulation and later disposal. A first spool 170 and a second spool 172 are provided to direct the filter tape along its path. The first spool 170 is used to direct the filter tape towards the slide 166 and facilitate transfer of the drained brewing substance cake 164 to the slide 166. The second spool 172 is provided to detect the movement of the tape 22.

The second spool 172 is attached to a structure 180 to provide support for a spool axle 182 supporting spool 172 as shown in FIG. 3. Similarly, a primary spool 162 shown in dotted line underneath an accumulation of tape 22 includes an axle 184 connected to a drive motor 186. The drive motor 186 is connected to the controller 50 over line 188. A sensor system 190 is associated with the second spool 172. The sensor system 190 includes a sensor 192 and a position indicator 194 coupled to the axle 182. In some embodiments, the position indicator 194 is in the form of a multipole magnet with the sensor 192 being a Hall Effect detector. Other forms of sensor systems 190 can be used including optical, mechanical, or other sensors. The magnetic Hall Effect sensor system 190 as shown may be a preferred embodiment since it tends to operate well in an environment which might include moisture as well as particulate matter such as a coffee brewing environment.

The sensor system 190 detects the movement of a predetermined length of filter tape 22 as detected by the position indicator 194 and sensor 192. This signal is communicated to the controller 50. As such, a predetermined length of filter tape 22 is detected and moved in response to a brew cycle being completed to provide a fresh filter surface and to dispose of the spent brewing substance 164. System 20 minimizes an amount of usable filter tape that is "wasted"

during take up. This is in contrast to other systems that use a predetermined number of rotation cycles of the take-up roll to move the filter tape which moves an increasing length of filter tape with each cycle as the diameter of the take-up roll expands. The sensor system 190 also allows the controller 50 to identify to a user when the take-up spool 162 should be changed after a predetermined number of cycles. As the spent filter tape 22 accumulates, it will take up more volume than the original unused filter tape 22. This is due to the expansion of the filter tape 22 from moisture, some particulate matter being retained on the filter tape 22, the removal or addition of wrinkles to the tape 22 as a result of the brewing process, as well as the spent filter tape 22 being rolled at lower tension than the original clean unused filter tape 22. As such, the spent filter tape 22 might need to be removed from the take-up spool 162 more than once for each fresh clean roll of filter tape 22.

Figure 2:
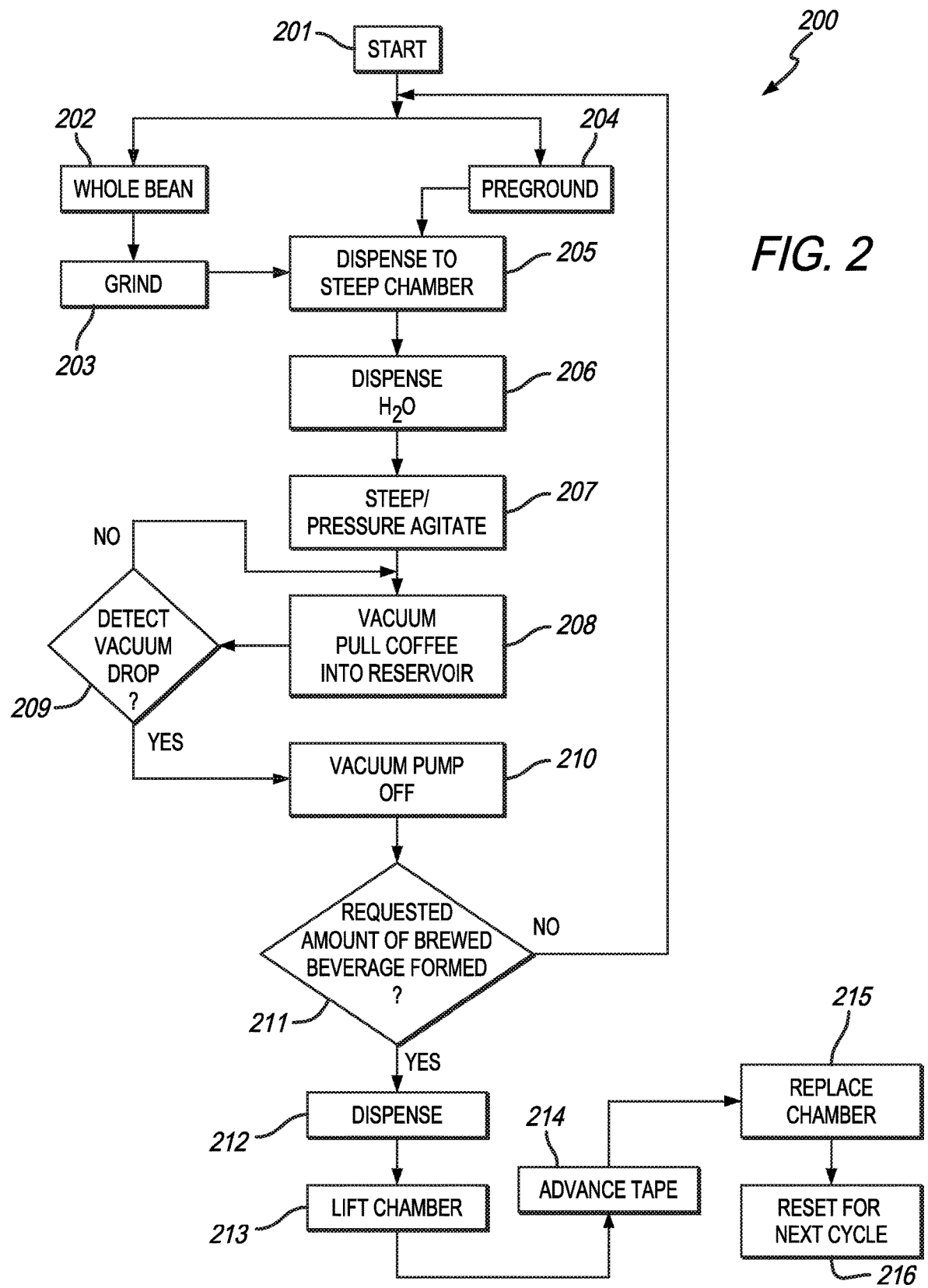
FIG. 2 is a flow chart illustrating one embodiment of a brew process used in the brewer system of FIG. 1.

One embodiment of a process 200 for using brewer system 20 is illustrated in FIG. 2. The process is started at 201, and a brew cycle begins with grinding whole bean brewing substance for dispensing, or dispensing preground brewing substance, into the steep chamber 24 as suggested at 202-205. Water is added to the chamber 24 to mix with the brewing substance as suggested at 206. The combined slurry can selectively be allowed to steep in the chamber 24, depending on the programming of the controller, and then can be agitated with pressure from the gas introduced to the reservoir 26 by controllably operating the gas pump as discussed above as suggested at 207.

After a predetermined steep time, or no steep time depending on the programming of the controller and the corresponding recipe, at least a partial vacuum is created in the reservoir 26 by the vacuum pump 106 to pull brewed beverage from the chamber 24 into the reservoir 26 as suggested at 208. The vacuum pull continues until vacuum pressure within the reservoir 26 drops off to or below a predetermined pressure and the vacuum pump 106 is turned off as suggested a 209-210. In some embodiments, a maximum vacuum pull time is used to turn off the vacuum pump 106 if the vacuum pressure does not drop off, such as when a filter or port becomes clogged for example. In some embodiments, a user is notified if the vacuum pull time exceeds a maximum time limit.

Additional brew cycles can be conducted depending on the volume of brewed beverage requested as suggested at 211. The volume of brewed beverage is stored in the reservoir 26 as an additional brew cycle or cycles are conducted. Once a desired predetermined amount of brewed beverage is formed, the brewed beverage is dispensed from the reservoir as suggested at 212. The chamber 24 is lifted off the reservoir 26 and the filter tape 22 is advanced to provide a fresh section of tape 22 and to dispose of the drained spent brewing substance 164 as suggested at 213-214. The chamber 24 is replaced onto the reservoir 26 and the system 20 is reset for another cycle as suggested at 215-216.

In illustrative embodiments, the system 20 is optimized to provide the best, freshest tasting cup of coffee produced. The system 20 is also optimized to minimize the brew cycle time to increase the number of cups of coffee that can be served back-to-back to reduce customer wait time. Additionally, the system 20 allows a variety of cup sizes to be formed instead of just a single cup size or serving size. Further, efficient use of the filter material that is in the form of a filter tape 22 is made by the system 20 to reduce waste of the tape 22.

In illustrative embodiments, a vacuum pump 106, an air pump 102, and three-way valve 112 are added to the system 20 to not only allow the chamber 24 to be evacuated, but to introduce compressed air into the chamber 24. Air is introduced into the reservoir 26 during the steeping process, and the air will pass through the filter element 32 and paper filter 22 into the steeping chamber 24. The action of the air bubble will agitate the steeping slurry, insuring even saturation of the ground coffee.

In illustrative embodiments, air can be introduced into the reservoir 26 when the dispense valve 60 opens to dispense the brewed beverage. The compressed air will break any seal created by excessive moisture on the filter element 32 and paper filter 22, allowing the reservoir 26 to vent. In some embodiments, the steep chamber 24 with the bed of coffee grounds could be left on the reservoir 26 during dispensing of the brewed beverage, and would result in at least a partial seal of the top of the reservoir 26. Compressed air would then be introduced into the reservoir 26 to expedite dispensing of the brewed beverage.

In illustrative embodiments, a capacity of reservoir 26 can be increased to hold the maximum size of beverage anticipated to be dispensed from the system 20. Multiple smaller brew batches can be made, and the brewed beverage collectively held in the reservoir 26 until all cycles have been completed. Only at that time would the dispense valve 60 open to dispense the brewed beverage into the cup.

In illustrative embodiments, a vacuum sensing device 120, such as a vacuum switch or transducer, can be connected into the reservoir line 110. On such devise would be simple vacuum switch. When the vacuum level from maximum begins to decay significantly, it can be safely assumed that all of the brewed beverage has been evacuated from the steeping chamber 24 into the lower reservoir 26. The vacuum process can then terminate, and move to the next step of the brew cycle.

The foregoing disclosure provides many improvements over the prior art.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation to encompass all such modifications and equivalent structures and functions.

What is claimed is:

1. A brewer system comprising:
   a reservoir formed to define a mouth extending into the reservoir;
   a filter tape extending over the mouth of the reservoir and movable relative to the reservoir;
   a steep chamber movable relative to the reservoir, the steep chamber configured to retain the filter tape over the mouth and to form a seal around the mouth;
   a brewing substance delivery system configured to dispense brewing substance into the steep chamber;
   a water delivery system configured to deliver water into the steep chamber to mix with the brewing substance and form a brewed beverage; and
   a pressure control system having a gas pump coupled to the reservoir and a vacuum pump coupled to the reservoir;

a sensor of the pressure control system configured to detect a drop in the vacuum pressure and used to shut off the vacuum pump when the vacuum pressure in the reservoir drops below at least a predetermined level; and wherein the gas pump is configured to pressurize the reservoir with a gas such that the gas passes through the mouth, through the filter tape, and into the steep chamber to agitate the water and brewing substance during formation of the brewed beverage, and the vacuum pump is configured to form at least a partial vacuum and pull brewed beverage from the steep chamber through the filter tape and mouth into the reservoir.

2. The system of claim 1, further comprising a controller coupled to the brewing substance delivery system, the water delivery system, and the pressure control system, and wherein the controller is configured to operate the brewing substance delivery system, the water delivery system, and the pressure control system at the selection of a user.

3. The system of claim 2, further comprising a chamber-displacement mechanism coupled to the steep chamber and to the coupled to the controller, wherein the chamber-displacement mechanism is configured to move the steep chamber relative to the reservoir.

4. The system of claim 2, further comprising a filter tape take-up system including a primary spool and a secondary spool, the primary spool configured to move the filter tape and collect used filter tape on the primary spool.

5. The system of claim 4, further comprising a sensor system including a sensor coupled to the controller and a position indicator coupled to the secondary spool, and wherein the sensor is configured detect the position indicator and provide a signal to the controller to stop movement of the filter tape after a predetermined number of revolutions of the secondary roller.

6. The system of claim 1, further comprising a filter element positioned in the mouth and configured to support the filter tape.

7. A method of forming a brewed beverage from a brewing substance, the method comprising:
   selectively positioning a filter tape over a mouth of a reservoir, the mouth extending into the reservoir;
   selectively positioning a steep chamber relative to the reservoir and retain the filter tape over the mouth to form a seal around the mouth of the reservoir;
   selectively delivering water and brewing substance to the steep chamber to form a volume of brewed beverage;
   selectively pressurizing the reservoir with a pressure control system to pass a gas through the mouth into the steep chamber and agitate the water and brewing substance;
   selectively forming at least a partial vacuum in the reservoir with the pressure control system to pull brewed beverage from the steep chamber through the filter tape and mouth and into the reservoir; and
   sensing when a vacuum pressure in the reservoir drops off; and
   shutting off a vacuum pump of the pressure control system when the vacuum pressure drops off.

8. The method of claim 7, further comprising:
   moving the steep chamber relative to the reservoir;
   moving the filter tape relative to the reservoir; and
   sensing a length of filter tape moved based on a number of revolutions of a roller in a tape-take up system.

9. The method of claim 7, further comprising:
   forming an additional volume of brewed beverage;
   combining the volumes of brewed beverage together in the reservoir; and
   collectively dispensing the combined volumes of brewed beverage from the reservoir.

* * * * *